(12) United States Patent
Kenneally et al.

(10) Patent No.: US 8,440,124 B2
(45) Date of Patent: May 14, 2013

(54) SINGLE SCREW EXTRUDER FOR DRYER BAR MANUFACTURE

(75) Inventors: Corey James Kenneally, Mason, OH (US); Robb Richard Gardner, Cincinnati, OH (US); Fleumingue Jean-Mary, West Chester, OH (US); Thomas Edward Dufresne, Morrow, OH (US); Darren Paul Trokhan, Hamilton, OH (US); Barry Michael Beagle, Union, KY (US); Scott Comstock, Fairfield, OH (US); Kurt Goris Houk, Stow, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 221 days.

(21) Appl. No.: 12/825,387

(22) Filed: Jun. 29, 2010

(65) Prior Publication Data

US 2011/0001257 A1 Jan. 6, 2011

Related U.S. Application Data

(60) Provisional application No. 61/222,276, filed on Jul. 1, 2009.

(51) Int. Cl.
*B29C 47/38* (2006.01)

(52) U.S. Cl.
USPC ............. 264/211.21; 264/177.1; 264/349; 264/176.1; 264/211.12; 264/211.13; 366/146; 366/149; 366/87; 366/79; 510/513; 510/515

(58) Field of Classification Search .......... 264/177.1, 264/349, 176.1, 211.21, 211.12, 211.13; 366/146, 149, 87, 79; 510/513, 515
See application file for complete search history.

(56) References Cited

U.S. PATENT DOCUMENTS

| 3,676,034 | A |   | 7/1972  | Wendricks              |         |
|-----------|---|---|---------|------------------------|---------|
| 3,736,668 | A | * | 6/1973  | Dillarstone            | 34/60   |
| 3,967,008 | A | * | 6/1976  | Mizuno et al.          | 427/242 |
| 4,055,248 | A | * | 10/1977 | Marsan                 | 510/515 |
| 4,224,266 | A | * | 9/1980  | Hunt et al.            | 264/75  |
| 4,254,139 | A | * | 3/1981  | Hendrickson et al.     | 428/60  |
| 4,696,575 | A |   | 9/1987  | Upmeier                |         |
| 4,808,367 | A | * | 2/1989  | Homma et al.           | 264/555 |
| 4,904,825 | A | * | 2/1990  | Govindan               | 562/84  |
| 4,994,223 | A |   | 2/1991  | Hestehave et al.       |         |
| 4,996,575 | A |   | 2/1991  | Ipri et al.            |         |
| 5,053,531 | A | * | 10/1991 | Govindan               | 562/114 |
| 5,064,594 | A | * | 11/1991 | Priester et al.        | 264/127 |
| 5,187,214 | A | * | 2/1993  | Govindan               | 524/157 |
| 5,332,513 | A | * | 7/1994  | Doms et al.            | 510/308 |
| 5,551,777 | A |   | 9/1996  | Tjahjadi et al.        |         |
| 5,655,835 | A |   | 8/1997  | Pham et al.            |         |

(Continued)

FOREIGN PATENT DOCUMENTS

CA 1021559 11/1977

OTHER PUBLICATIONS

International Search Report and Written Opinion from the International Searching Authority, mailed on Nov. 11, 2010, International Application No. PCT/US2010/040326, 11 pages.

*Primary Examiner* — Christina Johnson
*Assistant Examiner* — Saeed Huda
(74) *Attorney, Agent, or Firm* — Gary J. Foose

(57) ABSTRACT

Single screw extruder for making a dryer bar.

19 Claims, 8 Drawing Sheets

U.S. PATENT DOCUMENTS

| | | | |
|---|---|---|---|
| 5,704,555 A * | 1/1998 | Arastoopour | 241/16 |
| 5,993,186 A | 11/1999 | Floyd et al. | |
| 6,129,873 A | 10/2000 | Shelby et al. | |
| 6,270,291 B2 * | 8/2001 | Gamliel et al. | 405/263 |
| 6,454,983 B1 * | 9/2002 | McWilliams et al. | 264/211 |
| 6,475,972 B1 * | 11/2002 | Clignet | 510/417 |
| 6,705,752 B2 | 3/2004 | Grunschloss | |
| 6,779,740 B1 * | 8/2004 | Lentsch et al. | 239/43 |
| 6,814,481 B2 | 11/2004 | Colombo | |
| 6,883,723 B2 * | 4/2005 | Griese et al. | 239/43 |
| 6,899,281 B1 * | 5/2005 | Griese et al. | 239/60 |
| 6,908,041 B2 * | 6/2005 | Griese et al. | 239/43 |
| 6,910,640 B2 * | 6/2005 | Griese et al. | 239/43 |
| 6,910,641 B2 * | 6/2005 | Griese et al. | 239/43 |
| 7,037,886 B2 * | 5/2006 | Smith et al. | 510/451 |
| 7,055,761 B2 * | 6/2006 | Griese et al. | 239/60 |
| 7,087,572 B2 * | 8/2006 | Hubig et al. | 510/501 |
| 7,093,772 B2 * | 8/2006 | Griese et al. | 239/43 |
| 7,250,393 B2 * | 7/2007 | Lentsch et al. | 510/519 |
| 7,309,026 B2 * | 12/2007 | Griese et al. | 239/43 |
| 7,316,500 B2 | 1/2008 | Uphus | |
| 7,381,697 B2 * | 6/2008 | Lentsch et al. | 510/519 |
| 7,452,855 B2 * | 11/2008 | Hubig et al. | 510/519 |
| 7,456,145 B2 * | 11/2008 | Lentsch et al. | 510/519 |
| 7,524,809 B2 | 4/2009 | Trinh et al. | |
| 7,553,808 B2 * | 6/2009 | Tee et al. | 510/475 |
| 8,158,572 B2 * | 4/2012 | Schubert et al. | 510/466 |
| 2002/0016276 A1 * | 2/2002 | Spendel | 510/276 |
| 2002/0045562 A1 * | 4/2002 | Moe et al. | 510/474 |
| 2003/0192197 A1 * | 10/2003 | Griese et al. | 34/444 |
| 2003/0195130 A1 * | 10/2003 | Lentsch et al. | 510/327 |
| 2004/0167056 A1 * | 8/2004 | Lentsch et al. | 510/504 |
| 2004/0235705 A1 * | 11/2004 | Popplewell et al. | 510/515 |
| 2005/0192207 A1 * | 9/2005 | Morgan et al. | 510/520 |
| 2005/0202999 A1 * | 9/2005 | Woo et al. | 510/520 |
| 2007/0179082 A1 * | 8/2007 | Morgan et al. | 510/515 |
| 2007/0270327 A1 * | 11/2007 | Beck et al. | 510/515 |
| 2007/0281880 A1 * | 12/2007 | Morgan et al. | 510/515 |
| 2008/0136055 A1 * | 6/2008 | Cook et al. | 264/211.12 |
| 2011/0000068 A1 | 1/2011 | Kenneally et al. | |
| 2011/0021707 A1 * | 1/2011 | Kobayashi et al. | 525/190 |
| 2011/0028380 A1 * | 2/2011 | Aouad | 510/520 |
| 2012/0142578 A1 * | 6/2012 | Panandiker et al. | 510/515 |
| 2012/0142579 A1 * | 6/2012 | Panandiker et al. | 510/516 |

* cited by examiner

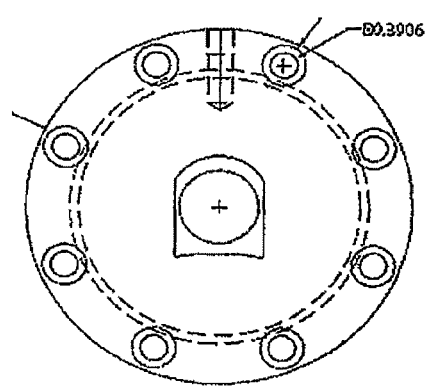 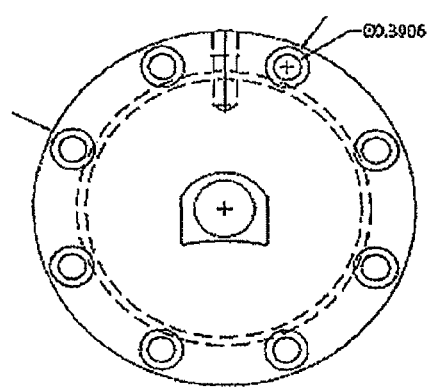
Fig. 4a                    Fig. 4b

| Dryer Bar | Void Volume | Performance | Method | Figure |
|---|---|---|---|---|
| ECOLAB - | 0.28% | Fail | Commercial | 7b, 8 |
| Pre-Production 1 | 0.17% | Fail | Twin | 1, 7a |
| Pre-Production 2 | 0.33% | Fail | Twin | |
| Pre-Production 3 | 0.33% | Fail | Twin | |
| Pre-Production 4 | 3.19% | Less preferred pass | Single | |
| Pre-Production 5 | 3.35% | Less preferred pass | Single | |
| Pre-Production 6 | 4.11% | Preferred pass | Single | |
| Pre-Production 7 | 4.45% | Preferred pass | Single | |
| Pre-Production 8 | 5.12% | Preferred pass | Single | |
| Pre-Production 9 | 6.54% | Preferred pass | Single | 2 |
| Pre-Production 10 | 7.45% | Less preferred pass | Single | |
| Production 1 | 4.28% | Preferred pass | Single | |
| Production 2 | 4.62% | Preferred pass | Single | 6b |
| Production 3 | 4.74% | Preferred pass | Single | |
| Production 4 | 5.72% | Preferred pass | Single | 6c |
| Production 5 | 6.51% | Preferred pass | Single | |
| Production 6 | 6.91% | Preferred pass | Single | 6a |
| Production 7 | 7.07% | Less preferred pass | Single | |

Fig. 5

SINGLE SCREW EXTRUDER FOR DRYER BAR MANUFACTURE

CROSS REFERENCE TO RELATED APPLICATIONS

This application claims the benefit of U.S. Provisional Application No. 61/222,276, filed on Jul. 1, 2009.

FIELD OF THE INVENTION

The present invention relates to the use of a single screw extruder in the manufacture of dryer bars.

BACKGROUND OF THE INVENTION

Multiple use dryer bars are a convenient alternative to dryer sheets since the bars can remain in the dryer over multiple dryer cycles, versus the typical single use that a dryer sheet is designed. U.S. Pat. No. 6,883,723; U.S. Pat. No. 6,899,281; and U.S. Pat. No. 6,910,640. However, a challenge with manufacturing such bars is having a process that has the speed, reliability, and/or cost that allows such products to be sold competitively in the consumer goods market place.

These bars often comprise fabric softener actives that are imparted to laundry as it dries in the automatic clothing dryer. Methods of producing such bars include melting fabric softener actives and then pouring them into molds. However, shortcomings of such an approach may include "yellowing" of the bars (e.g., oxidation). Certain previously described methods result in bars that may have brittleness or be susceptible to cracking during use (in the automatic clothing dryer). There is a need for a method of manufacturing dryer bars that reduces one or more of theses shortcomings.

See U.S. Pat. No. 7,037,886.

SUMMARY OF THE INVENTION

The present invention attempts to address these and other needs. A first aspect of the invention provides for a dryer bar comprising a fabric softening composition, wherein the fabric softening composition comprises a void volume percentage from about 0.33% to about 20% with respect to the total volume of the composition.

A second aspect of the invention provides for a fabric softening composition made by a single screw extrusion process, wherein the composition comprises a quaternary ammonium compound suitable for softening laundry, and wherein the composition comprises a void volume from about 3% to about 10% with respect to the total volume of the composition.

A third aspect of the invention provides for a method of softening fabric comprising the step of installing a dryer bar inside an automatic laundry drying machine, wherein the dryer bar comprises a fabric softening composition, wherein the composition comprises a quaternary ammonium compound and wherein the composition comprises a void volume from about 3% to about 10% with respect to the total volume of the composition.

A fourth aspect of the invention provides for a kit comprising: (a) an article wherein the article comprises a fabric softening composition, wherein the fabric softening composition comprises a quaternary ammonium compound and wherein the composition comprises a void volume from about 3% to about 10% with respect to the total volume of the composition; and (b) instructions instructing that the article be installed on an inside surface of an automatic laundry drying machine.

A fifth aspect of the invention provides for a method of making a dryer bar comprising the steps: providing a composition suitable for use as a dryer bar; extruding the composition through a single screw extruder to make an extruded composition. The single screw extruder comprises a channeled barrel comprising a channel containing a single screw within the channel, wherein the channeled barrel comprises at least the following regions: a feed region, a cooling region downstream from the feed region, and a heating/static mixing region downstream from the cooling region, wherein the single screw is capable of conveying the composition through the channel of the feed region, cooling region, and heating/static region. The method also comprises the steps of packing the fabric softening composition into the feed region of the single screw extruder; rotating the single screw to convey the composition down the channel of the channeled barrel from feed region to the cooling region and then to the heating/static mixing region; cooling the cooling region of the extruder to cool the composition as the composition is conveyed through the cooling region of the extruder; static mixing and heating the composition as the composition is conveyed through the heating/static mixing region of the extruder to make the extruded composition; optionally dieing the extruded composition with a die to form a died composition; and optionally stamping the died composition with a stamp to form the dryer bar.

A sixth aspect of the invention provides for a method of making a dryer bar comprising the steps: providing a composition that comprises a quaternary ammonium compound; extruding the composition through a single screw extruder to make an extruded composition. The single screw extruder comprises: a channeled barrel comprises a channel containing a single screw within the channel, wherein the channeled barrel comprises at least the following regions: a feed region; and a heating region downstream from the feed region; wherein the single screw is capable of conveying the composition from the channel of the feed region through the channel of the heating region. The method also comprises the steps: feeding the fabric softening composition into the feed region of the single screw extruder; rotating the single screw to convey the composition down the channel of the channeled barrel from feed region to the heating region; heating the composition as the composition is conveyed through the heating region of the extruder to make the extruded composition; and optionally stamping the extruded composition to form the dryer bar.

A seventh aspect of the invention provides for a method of making a dryer bar comprising the steps: providing a composition that comprises a quaternary ammonium compound; extruding the composition through a single screw extruder to make an extruded composition. The single screw extruder comprises: a channeled barrel comprises a channel containing a single screw within the channel, wherein the channeled barrel comprises at least the following regions: a feed region; and a static mixing region downstream from the feed region; wherein the single screw is capable of conveying the composition from the channel of the feed region through the channel of static mixing region. The method also comprises the steps: feeding or packing the fabric softening composition into the feed region of the single screw extruder; rotating the single screw to convey the composition down the channel of the channeled barrel from feed region to the heating region; heating the composition as the composition is conveyed through the heating region of the extruder to make the extruded composition; and optionally stamping the extruded composition with a stamp to form the dryer bar.

Other aspects of the invention include combinations of the previous aspects described.

BRIEF DESCRIPTION OF THE DRAWINGS

FIG. 4a is a cross section of a large die.

FIG. 4b is a cross section of a small die.

FIG. 5 is a table of various dryer bars that are tested and reporting the percentage of void volume, how the bar is made, and the performance of the bar.

DETAILED DESCRIPTION OF THE INVENTION

Dryer Bar Compositions

Figure 1:
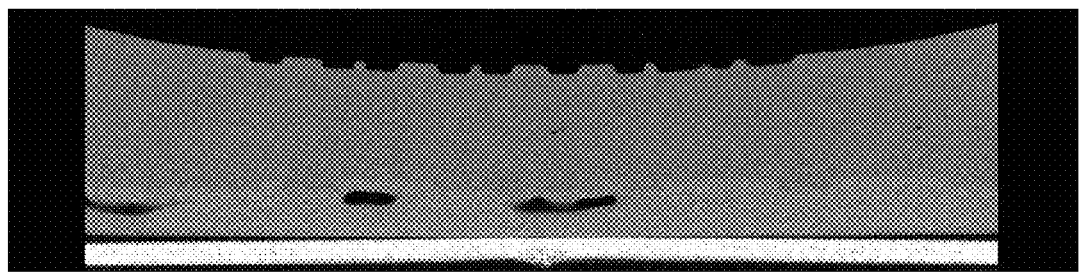
FIG. 1 is an image of a micro CT scan of a cross-section of a dryer bar (pre-production 1) that is made with a twin screw extruder having an undesirable 0.17% void volume.

Multiple use dryer bars may comprise a fabric softening composition, which in turn may comprise one or more fabric softener active(s). Examples of such actives are described US 2004/0167056 A1, paragraphs 0040-0047. One class of fabric softener actives includes cationic surfactants. Examples of cationic surfactants include quaternary ammonium compounds. Exemplary quaternary ammonium compounds include alkylated quaternary ammonium compounds, ring or cyclic quaternary ammonium compounds, aromatic quaternary ammonium compounds, diquaternary ammonium compounds, alkoxylated quaternary ammonium compounds, amidoamine quaternary ammonium compounds, ester quaternary ammonium compounds, and mixtures thereof. One non-limiting example of a fabric softening active is DXP 5522-048 from Evonik Goldschimidt Corp. (comprising about 80 wt % ethanaminium, 2-hydroxy-N,N-bis(2-hydroxyethyl)-N-methyl, methyl sulfate (salt), octadecanoate (ester)). The remaining 20 wt % of DXP 5522-048 is proprietary to Evonik Goldschimidt Corp. In one embodiment, the fabric softening active comprises from about 41 wt % to about 61 wt %, alternatively from about 43% to about 53 wt %, alternatively from about 49 wt % to about 52 wt %, alternatively combinations thereof, of the bar composition (wherein the bar composition is free of any "hardware" or other such plastic components.)

The dryer bar composition may also comprise a carrier component, such as a wax, suitable for use in an automatic laundry dryer. Examples of a "carrier component" may include those described in US 2004/0167056 A1, paragraphs 0063-0069. One example of a carrier component includes ACRAWAX C from Lonza Inc., (which is a mixture of N,N'-Ethylenebisstearamide, N,N'-Ethylenebispalmitamide, and fatty acid ($C_{14}$-$C_{18}$) The wt % of the components of ACRAWAX C is proprietary to Lonza, Inc. In one embodiment, the carrier component comprises from about 38 wt % to about 55 wt %, alternatively from about 41% to about 53 wt %, alternatively from about 47 wt % to about 52 wt %, alternatively combinations thereof, of the bar composition (wherein the bar composition is free of any "hardware" or other such plastic components.)

The dryer bar composition may also comprise a perfume. Examples of perfume include those described in US 2005-0192207 A1; and U.S. Pat. No. 7,524,809. In one embodiment, perfume comprises from about 0 wt % to about 6 wt %, alternatively from about 1% to about 5 wt %, alternatively from about 2 wt % to about 4 wt %, alternatively combinations thereof, of the bar composition (wherein the bar composition is free of any "hardware" or other such plastic components.) A suitable supplier of perfume is Avenil. In one alternative, the dryer bar is substantially free or free of perfume. In yet another embodiment, the dryer bar composition is free or essentially free of a detersive surfactant (e.g., anionic detersive surfactant).

The term "dryer bar" is used in the broadest sense. The term "bar" refers to any solid form, chunk, slab, wedge, lump etc. comprising a fabric condition composition that is substantially solid at the operating temperature of an automatic clothes dryer. Non-limiting examples of dryer bar shapes include those of FIGS. 1a, 1b, 2c, 2b, 3a, 3b, 4a, and 4b of US 2004/0167056 A1; CA 1,021,559; and U.S. Pat. No. 3,736,668.

The term "multiple use" means the dry bar may be used in the dryer for more than one cycle. Non-limiting examples include 2, 4, 6, 8, 10 12, or more times. In one embodiment, the product can be used for about 2 months, alternatively 4 months, alternatively from about 1 month to about 5 months.

The raw materials that comprise the dryer bar composition and that are to be processed by the single screw extruder are provided in physical forms suitable for processing in a single screw extruder. Physical forms of the raw materials may include flakes, noodles, pellets, pastilles, and the like. Conventional equipment suitable for processing these physical forms in the extruder may include belt flakers, rotoformers, plodders, and the like.

Single Screw Extruder

One aspect of the invention provides for the use of a single screw extruder to make the dryer bar composition. The use of a single screw extruder is preferred over a twin screw extruder. Without wishing to be bound by theory, a twin screw extruder provides high shear rates and intense mixing which leads to dryer bars with a highly crystalline structure with no voids or defects. By contrast, a single screw extruder provides lower shear rates and less intense mixing which leads to dryer bars that contain some voids and crystalline defects.

Figure 2:
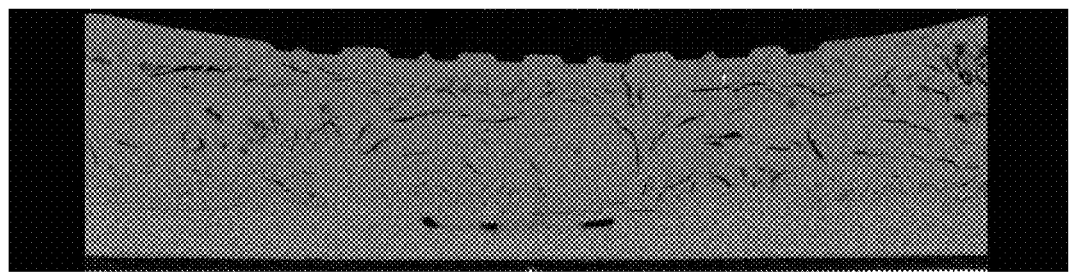
FIG. 2 is an image of a micro CT scan of a cross-section of a dryer bar (pre-production 9) that is made with a single screw extruder having a desirable 6.54% void volume.

FIG. 1 is an image of a micro CT scan of a cross-section of a dryer bar made with a twin screw extruder. The bars of FIG. 1 are generally observed to be more crystalline, dense, and brittle as compared to those dryer bars made with a single screw extruder. FIG. 2 is an image of a micro CT scan of a cross-section of a dryer bar made with a single screw extruder. The bars of FIG. 2 are generally observed to be more porous and less brittle than those bars made a twin screw extruder. Without wishing to be bound by theory, dryer bars comprising voids, as in FIG. 2, are more durable cycling in the dryer and less prone to cracking or shattering.

Non-limiting examples of single screw extruders are described in U.S. Pat. Nos. 3,676,034; 4,696,575; 4,996,575; 4,994,223; 5,551,777; 5,655,835; 5,704,555; 5,993,186; 6,129,873; and 6,705,752. A manufacturer of single screw extruders include Bonnot Company, 1520 Corporate Woods Parkway, Uniontown, Ohio 44885.

Figure 3:
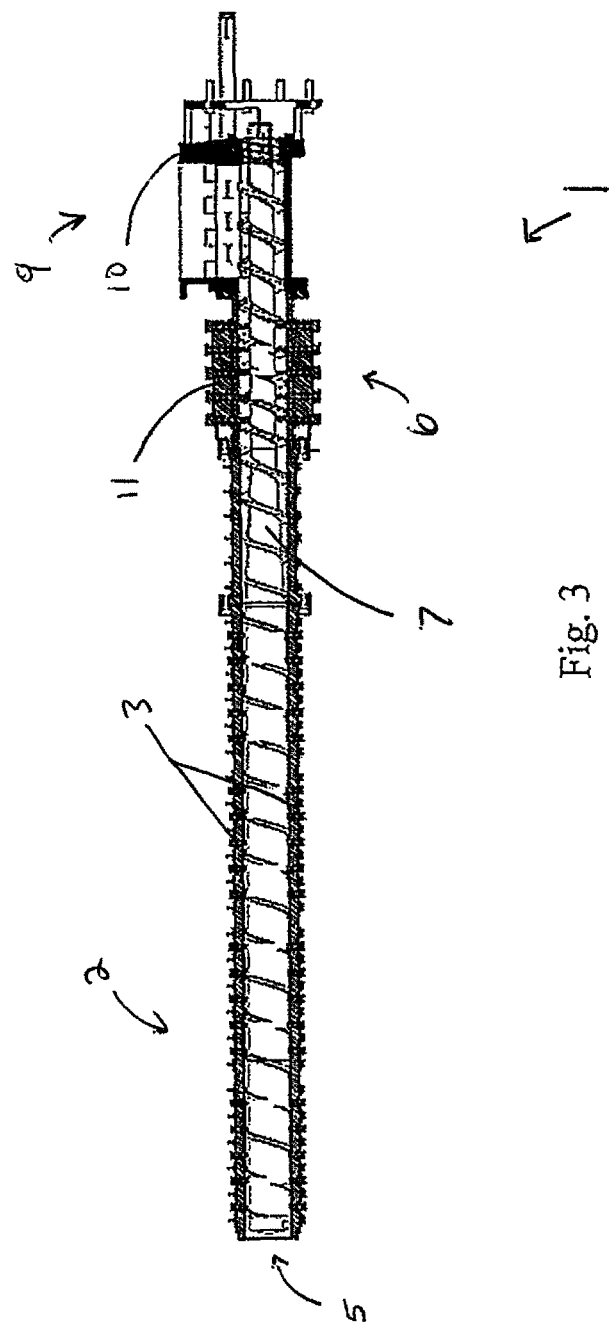
FIG. 3 is a cross section of a single screw extruder.

FIG. 3 is an example of a single screw extruder (1). The single screw extruder (1) comprises a channeled barrel (3) having a channel (5) containing a single screw (7) suitable for convening a composition down the channel (5) to produce extruded compositions suitable for optional dieing and/or stamping processes. The single screw extruder (1) may comprise one, two, or three, or more regions (or combinations thereof). For example, there is a feeding region (9) for feeding the composition into the channel (5). A packer (10) may be used to pack the composition into the channel (5) of the extruder (1). There is a cooling region (6), downstream from the feeder region (5), for cooling the composition contained in the channel (5) of the cooling region (6). A cooling jacket (11) may be used for the cooling. Downstream from the cooling region (6) is a heating/static mixing region (2) for heating and/or static mixing the composition contained in the channel (5). As the single screw (7) conveys the composition through the channel (5) of the channeled barrel (3), it conveys the composition through each of the regions (9, 6, 2) of the extruder (1).

Packer

A step in the process of making an extruded dryer bar composition may comprise feeding (preferably packing on large scale processes), the raw materials (i.e., a composition suitable for use in a dryer bar, alternatively a fabric softening composition) into the feeding region of the extruder. Packing may be accomplished by the use of a single or double paddle packer. In one specific example, the packer consists of two co-rotating screws, approximately 30 cm long, located above the entrance of the feed region of the single screw extruder. A simple feeder I (e.g., hopper (manual or automated) may be used for pilot or smaller scale operations. The rotations per minute ("rpm") of the packer is the same, or about the same, as single screw of the single screw extruder. Without wishing to be bound by theory, the packing provides particle size reduction of physical form of the raw materials and also ensures that the extruder is kept full at all times to provide consistent composition flow through the extruder.

Downstream of the feeding region of the single screw extruder, in some embodiments, is the cooling region.

Screw

The single screw of the extruder conveys the composition down the channel of the extruder from the feed region, through the cooling region, through the heating/static mixing region, to produce an extruded composition. Operating range of the rpm for the single screw depends on the scale of operation; however shear rate is typically held constant on scale-up. The overall length/diameter ratio ("L:D") of the screw is from about 10:1 to about 50:1, preferably 27:1, respectively. The screw is optionally heated or cooled by use of a hollow jacket.

In one embodiment, the single screw of the single screw extruder is powered by a 20 horse power motor, wherein the singe screw of an rpm from about 1 to about 60, alternatively from about 30 to about 50, alternatively combinations thereof.

Cooling Region

After packing the raw materials into the feed region, the next step in the process may comprise cooling the composition in the channel of the cooling region of the extruder as the composition is conveyed down the channel by the screw. A cooling step may not be necessary on smaller scale operations but may be a preferred embodiment on larger scales. An example of cooling in a single screw extruder process includes U.S. Pat. No. 5,704,555. Cooling can be provided by a jacket surrounding the channeled barrel, or alternatively by a hollow jacket within the barrel. Cooling water temperature is typically 5-30 degrees Celsius ("° C."). A non-limiting example of a cooling jacket includes Model No. S8422-A, from Stearlco Inc., Milwaukee, Wis. Without wishing to be bound by theory, the cooling allows a solid mass of the composition to be conveyed forward through the channel of the channeled barrel by the single screw while minimizing wall slip. There may be static mixing pins in the cooling region or the cooling region may be free of static mixing pins.

Optionally downstream of the cooling region is the heating/static mixing region.

Heating/Static Mixing Region

Another step of the process comprises static mixing and/or heating as the composition is conveyed down the channel of the channeled barrel of the single screw extruder. A static mixing step and/or heating step may not be necessary on smaller scale operations but may be a preferred embodiment on larger scales. Optional mixing devices can be used to promote melt temperature uniformity and/or distributive mixing. Examples of mixing devices include fluted mixers or mixing pins. Non-limiting examples of mixing pins on a single screw extruder may include those described in U.S. Pat. Nos. 4,696,575; 4,994,223; 6,814,481; 7,316,500. Heating may be provided by electric heaters on the exterior surface of the channeled barrel of the extruder. Depending on the design of the screw and the amount of shear imparted to the product, there may be product heating from viscous dissipation as well as from the electric heaters. The temperature of the electric heaters is monitored with thermocouples and ideally controlled to within 1° C. In one embodiment, the temperature is controlled to preferably melt the quaternary ammonium compound component but not the carrier component (e.g., wax) in order to promote product uniformity and dryer performance. The range of temperatures may include those from about 50° C. to about 80° C., wherein the temperature is measured by thermocouples on the electric heaters.

Without wishing to be bound by theory, the static mixing step may contribute in providing a more uniform dryer bar and a dryer bar that provides better performance (in the dryer in treating laundry).

Extrusion temperature may be an important control lever in delivering dryer bars having desirable in-dryer performance (in treating laundry). Generally, and without wishing to be bound by theory, we believe that higher the extrusion temperature, the more mass transfer from the dryer bar is released to fabric during each cycle in the dryer. However, if the extrusion temperature is too high, then resulting dryer bar generally becomes soft and sticky and is difficult to process. If the extrusion temperature is too low, process challenges are presented (e.g., not enough mixing etc.). The preferred range of extrusion temperatures in the heating region are from about 30° C. to about 90° C., alternatively from about 50° C. to about 80° C., alternatively from about 65 to about 75° C., alternatively combinations thereof. The temperature is measured by thermocouples on the electric heaters. These conditions may meet requirements for both product performance and process reliability.

Transition Regions

There may be one more transition regions along the single screw extruder that is free of cooling, heating, and/or static mixing. However, a transition region not be present.

Breaker Plate

In one aspect of the invention, the process is free of a breaker plate. At least one function of the breaker plate may include to exert higher back pressure to the composition contained in the channel of the channeled barrel of the extruder. In one embodiment of the present invention, the process has generally lower back pressure, for example, at or below 2 barg, alternatively from about 0 to about 2 barg, alternatively from about 0.0001 barg to about 1.5 barg, alternatively from about 0.01 barg to about 1 barg, alternatively from about 0.1 to about 0.5 barg, alternatively combinations thereof. A pressure gauge in a feed pipe between the extruder and the die is a suitable location to measure this pressure.

Die

Another step of the process may comprise dieing the extruded composition (from the single screw extruder). The die is typically a metal plate which is located at the outlet of the extruder. The size and shape of the die can be varied to achieve a desired profile for the extrudate, e.g., a cylindrical prism, or a rectangular prism, etc. In one embodiment, the die may comprise a large cyclindrical prism of FIG. 4a. In another embodiment, the die may comprise a small cyclindrical prism of FIG. 4b.

A feed pipe may be used between the end of the extruder and the die plate which can vary in length and diameter profile to optimize the backpressure in the channel of the extruder and to promote even flow of the extruded composition exiting from the extruder. Typically the cross sectional area of the die plate is different than the cross sectional area of the channel, and the diameter profile of the feed pipe may resemble a converging or a diverging nozzle. Band heaters are optionally provided on the feed pipe to regulate the final outlet temperature. This feature may be useful to achieve a desired surface temperature for the extruded composition.

In one embodiment, the die is heated, which in turn heats the outer surface extruded composition thereby providing a smooth outer surface before the stamping step. The temperature of the die may be about lower than the heat imparted to the composition during previous steps.

In another embodiment, the operating rate of the single screw extruder providing died composition is from about 100 kg per hour to about 1,000 kg per hour, alternatively from about 200 kg per hour to about 900 kg per hour, alternatively from about 300 kg per hour to about 1000 kg per hour, alternatively combination thereof.

Stamping

The died composition may be formed into a suitable dryer bar shape by conventional stamping process. The composition is preferably stamped while the temperature of the composition is elevated (i.e., from the extrusion/dieing processing steps). Any suitable shape can likely be used. In one embodiment, the composition of the dryer bar is stamped on to a plastic carrier. Plastic carriers are described, for example, in U.S. Pat. No. 6,908,041 (describing "plate member 11; "product carrier 21"; and the like). Generally, and without limitation, plastic carriers are used to help attach the dryer bar to an inside surface of the automatic laundry dryer. Therefore, in one embodiment, the dryer bar comprising a composition stamped on to a plastic carrier.

Dryer Bars Comprising Void Volumes

The methods described, in preferred embodiments, make dryer bars comprising void volumes of defined percentage ranges. Using image analysis techniques such as micro computed tomography ("MicroCT") these void volume percentages may be assessed. The void volume expressed as a percentage of the dryer bar composition (wherein the bar composition is free of any "hardware" or other such plastic components) is calculated by: (i) obtaining the volume of the non-void volume ($mm^3$) in dryer bar composition of the dryer bar; (ii) obtaining the total volume of the dryer bar composition of the dryer bar (void volume+non-void volume); (iii) 1−[non-void volume/total volume]×100%=percent void volume.

One aspect of the invention provides for dryer bar having a dryer bar composition, wherein the composition (free of any "hardware" or other such plastic components) comprises a void volume percentage greater than 0.33%, alternatively from about 0.4% to about 20%, alternatively from about 1% to about 15%, alternatively from about 3% to about 10%, alternatively from about 3% to about 8%, alternatively from about 3.19% to about 7.45%, alternatively from about 3.35% to about 7.07%, alternatively from about greater than 3.35% but less than about 7.07%, alternatively from about 4% to about 7%, alternatively from about 4.11% to about 6.91%, alternatively combinations thereof. In one embodiment, the dryer bar, comprising the void volume percentages with respect the dryer bar composition, is made according a single screw extrusion process.

The term "void" means an area of the dryer bar composition of the dryer bar that is devoid of solid composition. For purposes of clarification, the void may have air, gases, perfume vapor, moisture, and other non-solid components.

MicroCT reports the X-ray absorption of a sample in the three-dimensional Cartesian coordinates system. The instrument uses a cone beam X-ray source to irradiate the sample. The radiation is attenuated by the sample and a scintillator converts the transmitted X-ray radiation to light and passes it into an array of detectors. The obtained two-dimensional (2D) image, also called projected image, is not sufficient to determine the X-ray absorption specific for each volume element (voxel). So, a series of projections is acquired from different angles as the sample is rotated (with the smallest possible rotation steps to increase precision) to allow reconstruction of the three-dimensional (3D) space.

The 3D datasets are commonly saved as 8 bit images (256 gray levels) but higher resolutions may be used. X-ray attenuation is largely a function of the material density of the sample, so denser samples require a higher energy to penetrate and appear brighter (higher attenuation). Intensity differences in gray levels are used to distinguish between void and non-void areas of the dryer bar.

Resolution is a function of the diameter of the field of view (FOV) and the number of projections used. The obtained 3D dataset is visualized and analyzed via image processing software applications to determine different measures of the sample's 3D structures. One example of suitable instrumentation includes SCANCO (Scanco Medical, Basserdorf, Switzerland) systems-μCT 80 with an energy range of 35 to 70 kVp. The maximum FOV is 80 mm in diameter by 140 mm in height for the μICT 80.

Intact bars are scanned in the μCT 80 using the following image acquisition parameters; 45 kVp, 177 μA, 61.4 mm field of view, 800 ms integration time, 2 averages, 500 projections. Samples were secured in a cylindrical tube during imaging. The reconstructed data set consisted of a stack of images, each 1024×1024 pixels, with an isotropic resolution of 60 μm. The number of slices acquired is typically 1664, covering 9.98 cm of the length of the bar.

Material volume and total volume measurements (and thus void volume percentage) is made using Scanco Medical's Bone Trabecular Morphometry evaluation (e.g., Scanco Module 64-bit Version V5.04e). A typical reference volume within the dryer bar composition to be assessed is about 84×516×1662 voxels. The threshold value used in the Scanco software is 52.

Dryer Bars Evaluated

FIG. 5 is a table of various dryer bars that are tested and reports the percentage of void volume, how the bar is made, and the performance of the bar. FIGS. 6-8 are micro CT scans of some of the bars tested in FIG. 5.

Desired performance of the bar is an optimal level of bar mass transfer to fabric in a dryer. Performance failure is due to the bar, for example being too hard, for effective mass transfer (thereby having minimal fabric benefits) as in the case of low void volume percent values. Performance failure may also be due to, for example, the dryer bar composition being too soft, resulting in undesirable excess of mass transfer to fabric (e.g., potentially leading to fabric staining under certain dryer conditions; uneven distribution on fabric, and the like).

Figure 6A:
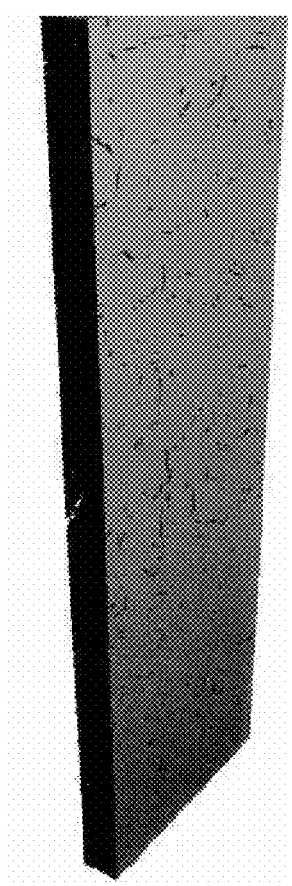
FIG. 6a is an image of a micro CT scan of a cross-section of a dryer bar (production 6) that is made with a single screw extruder having a desirable 6.91% void volume.

FIG. 6a is an image of a micro CT scan of a cross-section of a dryer bar (production 6) that is made with a single screw extruder having a desirable 6.91% void volume.

Figure 6B:
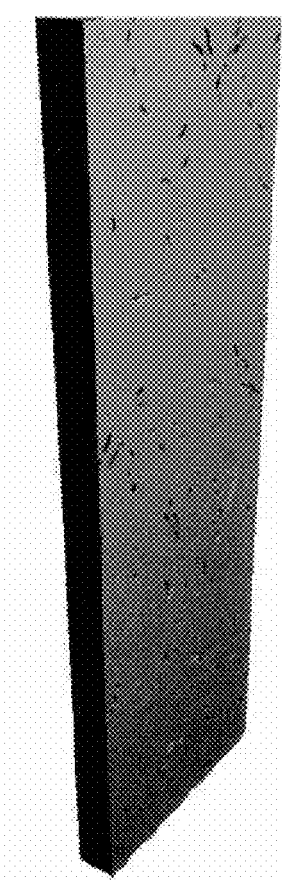
FIG. 6b is an image of a micro CT scan of a cross-section of a dryer bar (production 2) that is made with a single screw extruder having a desirable 4.62% void volume.

FIG. 6b is an image of a micro CT scan of a cross-section of a dryer bar (production 2) that is made with a single screw extruder having a desirable 4.62% void volume.

Figure 6C:
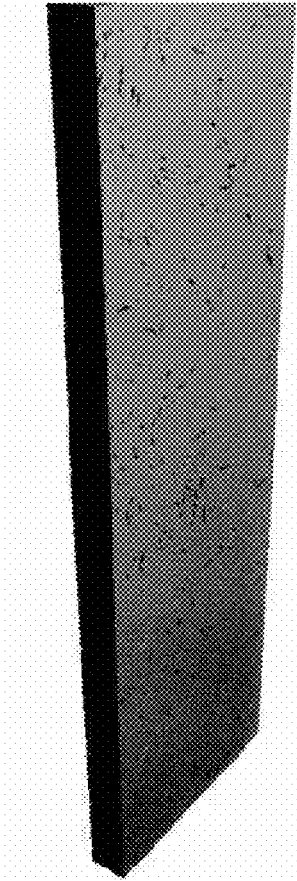
FIG. 6c is an image of a micro CT scan of a cross-section of a dryer bar (production 4) that is made with a single screw extruder having a desirable 5.72% void volume.

FIG. 6c is an image of a micro CT scan of a cross-section of a dryer bar (production 4) that is made with a single screw extruder having a desirable 5.72% void volume.

Figures 7A, 7B:
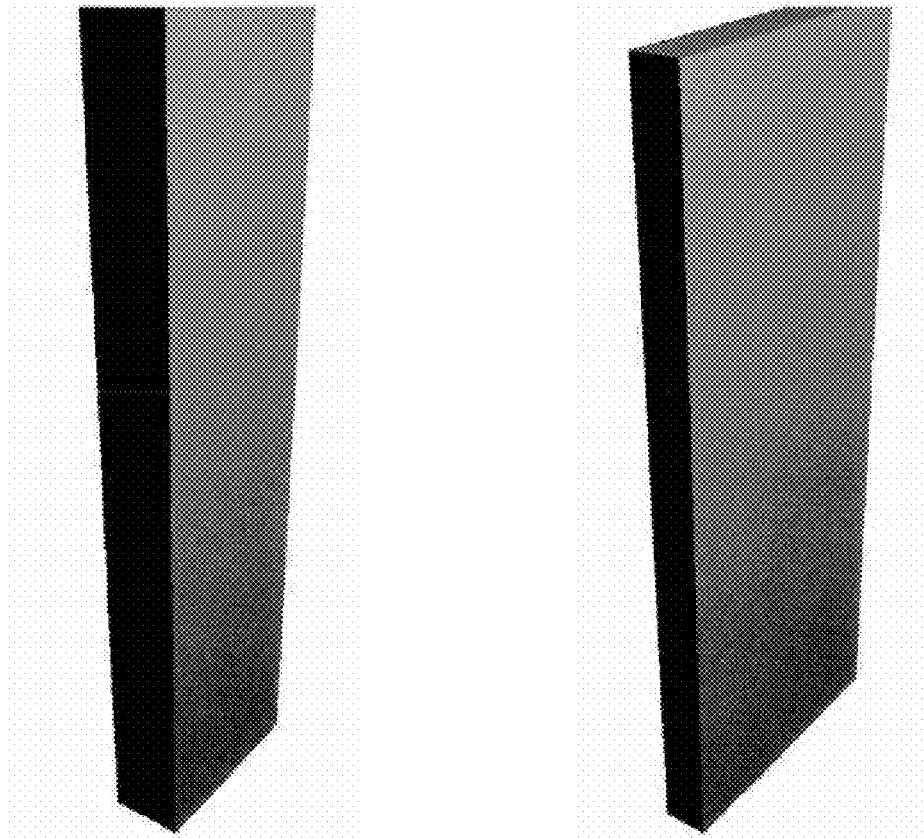
FIG. 7a is yet another image of a micro CT scan of a cross-section of a dryer bar of FIG. 1.
FIG. 7b is an image of a micro CT scan of a cross-section of a dryer-bar commercially available from Ecolab. The bar has an undesirable void volume of 0.28%.
Figure 8:
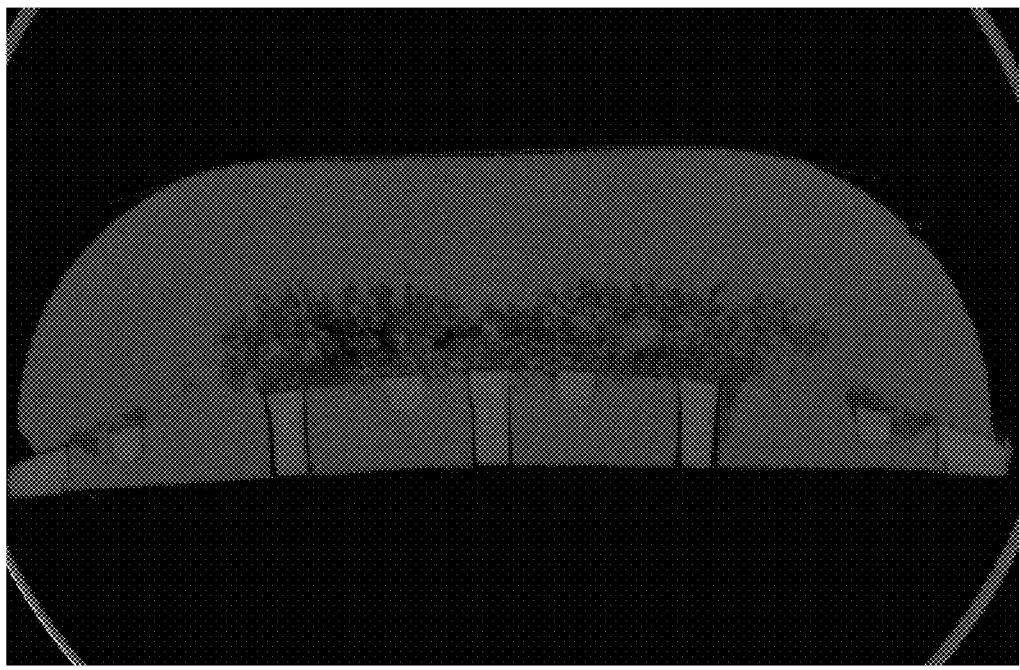
FIG. 8 is yet another image of a micro CT scan of the Ecolab bar of FIG. 7b.

FIG. 7a is yet another image of a micro CT scan of a cross-section of a dryer bar of FIG. 1.

FIG. 7b is an image of a micro CT scan of a cross-section of a dryer-bar commercially available from Ecolab. The bar has an undesirable void volume of 0.28%.

FIG. 8 is yet another image of a micro CT scan of the Ecolab bar of FIG. 7b.

Examples of methods of making dryer bars are provided.

EXAMPLE 1

Small Scale

The dryer bar composition comprises a fabric softener active, a carrier component, and perfume. Raw materials for this composition are added to the extruder as flakes, approximately 1 mm in thickness and 0.5-2 cm in diameter.

The single screw extruder has a 1.5" diameter single screw with 36" length (24:1 L:D ratio). The rpm range of the single screw is from 50 to 144. The entire length of the extruder is heated with 3 separate heating zones. Since the extruder is a pilot plant scale model, there is no twin packer, cooling zone, or mixing pins used.

The three heating zone temperatures of the extruder are set to 60° C. and the band heater on the die is also set at 60° C. Three different die sizes are used: a circular die with a diameter of ⅝", a circular die with a diameter of 1⅜", and a rectangular die with dimensions of 1⅛"×1⅛". The output rates are as follows:

| Rpm | ⅝" die | 1⅜" die | rectangular die |
|---|---|---|---|
| 50 | 220 gr/min | 237 gr/min | 229 gr/min |
| 75 | 288 | 310 | 304 |
| 100 | 398 | 359 | 352 |
| 125 | 490 | 428 | 430 |
| 144 | 568 | 496 | 486 |

Extrudates are cut into approximately 5" lengths by hand and stamped onto a plastic base using a hydraulic press with a custom designed mold. The dryer bars have satisfactory appearance and performance.

EXAMPLE 2

Larger Scale

The dryer bar composition comprises a fabric softener active, a carrier component, and perfume. The composition is 50.5 wt % fabric softener active, 46 wt % wax, and 3.5 wt % perfume. The composition is added to the extruder as flakes, approximately 1 mm in thickness and 0.5-2 cm in diameter.

The single screw extruder has a 4" diameter single screw with 108" length (27:1 L:D). The range of rpm is 23-45. Temperature is controlled for the cooling zone and for five heating zones on the extruder. A twin packer is used between a feed hopper and feeding zone of the single screw extruder to ensure consistent loading. The regions of the single screw extruder is as follows: 3:1 L:D feeding section, 4:1 L:D cooling section, 4:1 L:D heating section, 4:1 L:D first mixing section with 39 mixing pins, and 12:1 L:D second mixing section with 126 mixing pins.

The temperature set-point for the cooling section is at 21° C. and the set-point for each of the extruder heating section is at 73° C. The set-point for heating the die is at 70° C. The dies of FIGS. 4a and 4b may be used. The operating rate for the smaller die is about 204 kg/hr at 30 rpm and the operating rate for the larger die is about 340 kg/hr at 45 rpm.

Extrudates are cut to approximately 5" lengths using an automated cutter and are stamped onto a plastic base using a hydraulic press with a custom designed mold. The dryer bars have satisfactory appearance and dryer performance.

While the specification concludes with the claims particularly pointing and distinctly claiming the invention, it is believed that the present invention will be better understood from the following description.

The compositions of the present invention can include, consist essentially of, or consist of, the components of the present invention as well as other ingredients described herein. As used herein, "consisting essentially of" means that the composition or component may include additional ingredients, but only if the additional ingredients do not materially alter the basic and novel characteristics of the claimed compositions or methods.

All percentages and ratios used herein are by weight of the total composition and all measurements made are at 25° C., unless otherwise designated. An angular degree is a planar unit of angular measure equal in magnitude to 1/360 of a complete revolution.

All measurements used herein are in metric units unless otherwise specified.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

All documents cited are, in relevant part, incorporated herein by reference; the citation of any document is not to be construed as an admission that it is prior art with respect to the present invention.

What is claimed is:

1. A method of making a dryer bar comprising the steps:
   (a) providing a dryer bar composition suitable for use as a dryer bar;
   (b) extruding the dryer bar composition through a single screw extruder to make an extruded dryer bar composition comprising:
      (i) providing the single screw extruder, wherein the single screw extruder comprises:
         a channeled barrel comprising a channel containing a single screw within the channel, wherein the channeled barrel comprises at least the following regions:
            a feed region,
            a cooling region downstream from the feed region, and
            a heating/static mixing region downstream from the cooling region;
         wherein the single screw is capable of conveying the dryer bar composition through the channel of the feed region, cooling region, and heating/static region;
      (ii) packing the dryer bar composition into the feed region of the single screw extruder;
      (iii) rotating the single screw to convey the dryer bar composition down the channel of the channeled barrel from feed region to the cooling region and then to the heating/static mixing region;
      (iv) cooling the cooling region of the extruder to cool the dryer bar composition as the dryer bar composition is conveyed through the cooling region of the extruder;
      (v) static mixing and heating the dryer bar composition as the dryer bar composition is conveyed through the heating/static mixing region of the extruder to make the extruded dryer bar composition;
   (c) dieing the extruded dryer bar composition with a die to form a died dryer bar composition; and
   (d) stamping the died dryer bar composition with a stamp to form the dryer bar.

2. The method of claim 1, wherein the dryer bar composition further comprises a quaternary ammonium compound.

3. The method of claim 2, wherein the dryer bar comprises a mass from about 20 grams to about 150 grams, wherein the mass of the dryer bar is free of any plastic or other hardware components.

4. The method of claim 1, wherein the rotation of the single screw comprises from about 10 rpm (rotations per minute) to about 70 rpm.

5. The method of claim 1, wherein the dryer bar composition contained within the channel has back pressure from about 0.01 barg to about 0.5 barg.

6. The method of claim 1, wherein the die of the dieing step comprises a cylindrical prism or rectangular prism shape.

7. The method of claim 1, wherein the dryer bar composition comprises a wax carrier.

8. The method of claim 7, wherein the dryer bar composition comprises about 38 wt % to about 55 wt % of the wax carrier.

9. The method of claim 1, wherein the dryer bar composition comprises from about 41 wt % to about 61 wt % of a fabric softening composition.

10. The method of claim 9, wherein the dryer bar composition comprises a wax carrier.

11. A method of making a dryer bar comprising the steps:
   (a) providing a dryer bar composition suitable for use as a dryer bar,
      wherein the dryer bar composition comprises a quaternary ammonium compound;
   (b) extruding the dryer bar composition through a single screw extruder to make an extruded dryer bar composition comprising:
      (i) providing the single screw extruder, wherein the single screw extruder comprises:
         a channeled barrel comprises a channel containing a single screw within the channel, wherein the channeled barrel comprises at least the following regions:
            a feed region; and
            at least one heating region downstream from the feed region;
         wherein the single screw is capable of conveying the dryer bar composition from the channel of the feed region through the channel of the heating region;
      (ii) feeding the dryer bar composition into the feed region of the single screw extruder;
      (iii) rotating the single screw to convey the dryer bar composition down the channel of the channeled barrel from feed region to the heating region;
      (v) heating the dryer bar composition as the dryer bar composition is conveyed through the heating region of the extruder to make the extruded dryer bar composition;
   (c) providing a plastic carrier; and
   d) stamping the extruded dryer bar composition onto said plastic carrier to form the dryer bar.

12. The method of claim 11, further comprising the step of dieing the extruded dryer bar composition with a die to form a died dryer bar composition before stamping the died dryer bar composition.

13. The method of claim 11, wherein the dryer bar composition comprises a wax carrier.

14. The method of claim 13, wherein the dryer bar composition comprises about 38 wt % to about 55 wt % of the wax carrier.

15. The method of claim 11, wherein the dryer bar composition comprises from about 41 wt % to about 61 wt % of a fabric softening composition.

16. A method of making a dryer bar comprising the steps:
   (a) providing a dryer bar composition suitable for use in a dryer bar,
      wherein the dryer bar composition comprises a quaternary ammonium compound;
   (b) extruding the dryer bar composition through a single screw extruder to make an extruded dryer bar composition comprising:
      (i) providing the single screw extruder, wherein the single screw extruder comprises:
         a channeled barrel comprises a channel containing a single screw within the channel, wherein the channeled barrel comprises at least the following regions:
            a feed region; and
            a static mixing region downstream from the feed region;
         wherein the single screw is capable of conveying the dryer bar composition from the channel of the feed region through the channel of static mixing region;
      (ii) feeding or packing the dryer bar composition into the feed region of the single screw extruder;
      (iii) rotating the single screw to convey the dryer bar composition down the channel of the channeled barrel from feed region to the heating region;

(v) heating the dryer bar composition as the dryer bar composition is conveyed through the heating region of the extruder to make the extruded dryer bar composition;

(c) providing a plastic carrier; and d) stamping the extruded dryer bar composition onto said plastic carrier with a stamp to form the dryer bar.

17. The method of claim 16, wherein the dryer bar composition comprises a wax carrier.

18. The method of claim 17, wherein the dryer bar composition comprises about 38 wt % to about 55 wt % of the wax carrier.

19. The method of claim 16, wherein the dryer bar composition comprises from about 41 wt % to about 61 wt % of a fabric softening composition.

* * * * *